(12) United States Patent
Depelsenaire

(10) Patent No.: US 6,254,846 B1
(45) Date of Patent: *Jul. 3, 2001

(54) PROCESS FOR PURIFYING FUMES AND FOR MANUFACTURING AN AQUEOUS SODIUM CHLORIDE SOLUTION

(75) Inventor: Guy Depelsenaire, Court-Saint-Etienne (BE)

(73) Assignee: Solvay (Société Anonyme), Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/140,549

(22) Filed: Aug. 26, 1998

(30) Foreign Application Priority Data

Aug. 28, 1997 (BE) .................................................. 09700707

(51) Int. Cl.⁷ .............................. C01D 3/04; B01D 53/70

(52) U.S. Cl. .................................. 423/499.4; 423/240 S; 588/257

(58) Field of Search ............................ 423/240 S, 499.4; 588/257, 206, 207; 106/DIG. 1, 624

(56) References Cited

U.S. PATENT DOCUMENTS

| | | | |
|---|---|---|---|
| 4,659,385 | * 4/1987 | Costopoulos et al. | 588/257 |
| 4,737,356 | * 4/1988 | O'Hara et al. | 588/256 |
| 4,767,605 | * 8/1988 | Lindbauer et al. | 423/239.1 |
| 4,789,532 | * 12/1988 | Jons et al. | 423/240 R |
| 5,196,620 | * 3/1993 | Gustin et al. | 588/257 |
| 5,367,116 | * 11/1994 | Frey | 588/252 |
| 5,416,252 | * 5/1995 | Sorrentino et al. | 588/257 |
| 5,478,447 | * 12/1995 | Ninane et al. | 205/516 |
| 5,616,160 | * 4/1997 | Alexander et al. | 65/27 |
| 5,769,938 | * 6/1998 | Ueshima et al. | 106/718 |

FOREIGN PATENT DOCUMENTS

| | | | |
|---|---|---|---|
| 686310 B | * 2/1998 | (AU) | 423/240 S |
| 0603218B1 | 6/1994 | (EP) . | |
| 0 800 871 | * 10/1997 | (EP) . | |
| 95/19835 | 7/1995 | (WO) . | |
| 96/07468 | 3/1996 | (WO) . | |
| 97/31874 | 9/1997 | (WO) . | |

OTHER PUBLICATIONS

Heavy Metals in Wastewater and Sludge Treatment Processes vol. I, CRC Press, Inc.; 1987; p. 2, (No month).

VGB Kraftwerkstechnik 69, Heft 2, Feb. 1989, pp. 212–220.

* cited by examiner

Primary Examiner—Ngoc-Yen Nguyen
(74) Attorney, Agent, or Firm—Venable; Marina V. Schneller

(57) ABSTRACT

Process for purifying fumes originating from the incineration of household waste and for manufacturing an aqueous sodium chloride solution, according to which the fumes (3) are subjected to a dust-removal operation in order to separate out the ash (5), which is washed with water, the dust-free fumes (9) are treated with a basic reagent (11) comprising a sodium compound, and they are then subjected to a dust-removal operation, the dust (16) collected from the dust-removal operation is dispersed in water (8) originating from the washing of the ash (5), and the aqueous sodium chloride solution thus obtained (19) is purified.

10 Claims, 1 Drawing Sheet

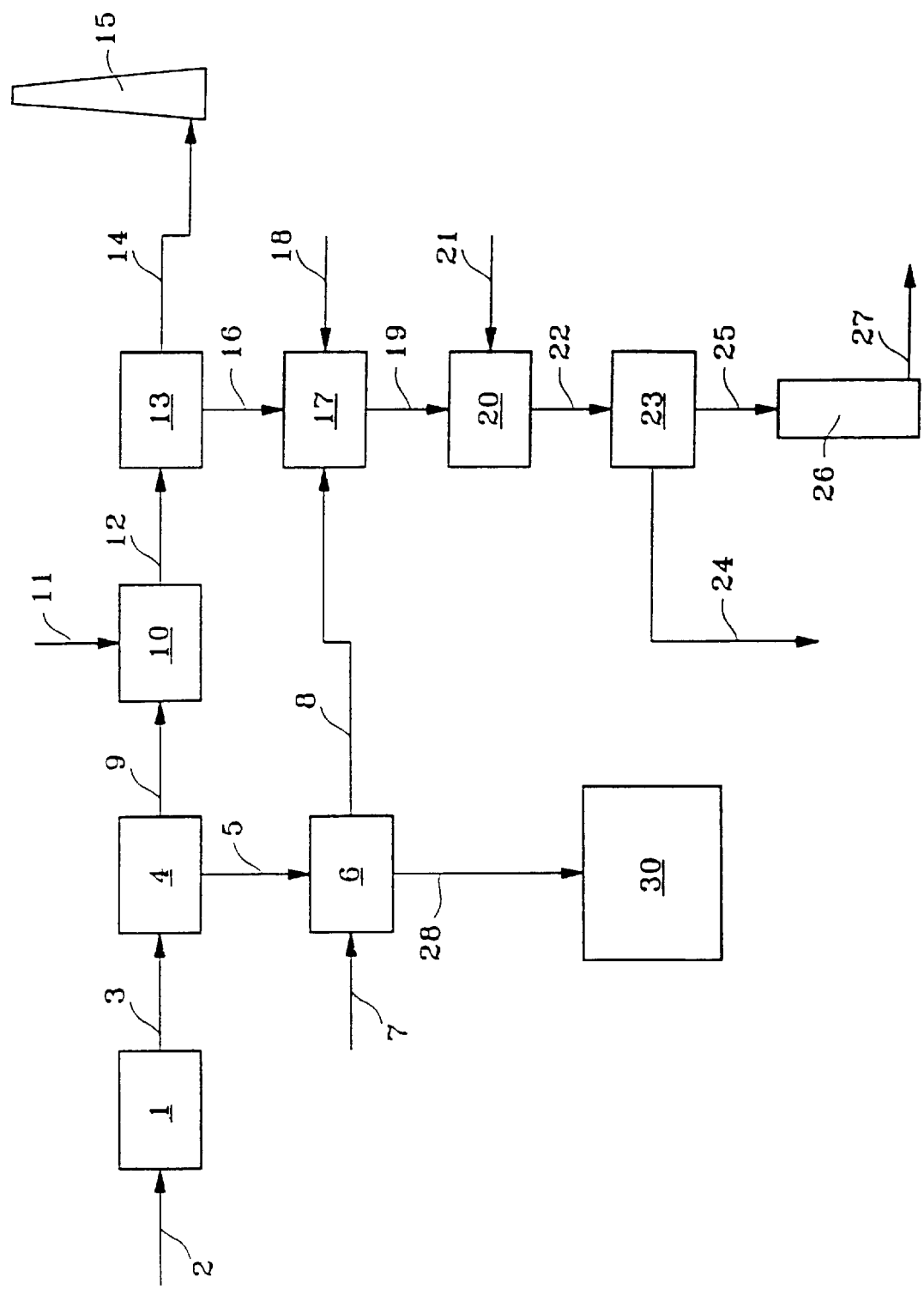

PROCESS FOR PURIFYING FUMES AND FOR MANUFACTURING AN AQUEOUS SODIUM CHLORIDE SOLUTION

BACKGROUND OF THE INVENTION

Household, urban or hospital waste usually contains large amounts of organic residues, in particular organochlorine residues, and heavy metals (in particular zinc, lead, cadmium, mercury and chromium). It also often contains metal chlorides (particularly sodium chloride) and aluminium. A technique regularly used to reduce the volume of this waste consists in incinerating it. The incineration of such waste leads to the formation of toxic fumes containing hydrogen chloride, volatile heavy metals and ash. This ash invariably contains metal chlorides, organic residues (in particular dioxins and furans), heavy metals and unburnt materials, in which aluminium metal is often found. Before being disharged into the atmosphere, these fumes must consequently be freed of dust and purified.

European patent EP-0,603,218 [Solvay (Société Anonyme)] describes a process designed to purify such fumes and simultaneously to produce an aqueous sodium chloride solution which can be used in an industrial process. According to this known process, after they have been freed of dust, the fumes are purified to remove hydrogen chloride and volatile heavy metals. To this end, they are treated with sodium bicarbonate in order to decompose the hydrogen chloride and to form sodium chloride, and they are then subjected to a filtration in which a solid residue comprising the sodium chloride and the heavy metals is collected. In order to obtain the industrial aqueous sodium chloride solution, the solid residue is dispersed in water, the aqueous medium thus obtained is basified in order to precipitate the heavy metals in the form of metal hydroxides, the precipitate formed is separated out and the resulting aqueous sodium chloride solution is treated on a chelating resin.

In this known process, the ash separated from the fumes in the dust-removal step (which precedes the removal of hydrogen chloride) generally contains water-soluble chlorine-containing compounds (in particular sodium chloride), heavy metals (in particular zinc, lead, cadmium, mercury and chromium), organic derivatives and unburnt materials (in which aluminium metal can be found). The presence of water-soluble substances, heavy metals and toxic organic materials (dioxins and furans) can pose difficulties for the disposal of this fly ash and involves subjecting it beforehand to an inertization process intended to make it harmless to the environment. An effective inertization process is described in international patent application PCT/EP 97/00778 [Solvay (Société Anonyme)].

BRIEF SUMMARY OF THE INVENTION

The invention is directed towards providing a process for the production of an aqueous sodium chloride solution starting with fumes of the type defined above, which makes it possible to upgrade the sodium chloride present in the ash and moreover facilitates its inertization.

BRIEF DESCRIPTION OF THE DRAWINGS

The single FIGURE in the attached drawing represents the plan of a plant using a specific embodiment of the process according to the invention.

DETAILED DESCRIPTION OF THE INVENTION

Consequently, the invention relates to a process for, on the one hand, purifying fumes laden with ash, originating from the incineration of waste which contains heavy metals, sodium chloride and organochlorine residues, and, on the other hand, for manufacturing an aqueous sodium chloride solution, in which process in a first step, the fumes are subjected to a dust-removal operation, from which fumes freed of dust, on the one hand, and ash, on the other hand, are collected separately;

in a second step, the fumes freed of dust are treated with a basic reagent comprising a sodium compound, and a gas laden with dust is collected;

in a third step, the gas is subjected to a dust-removal operation, from which a gas freed of dust, on the one hand, and the dust, on the other hand, are collected;

in a fourth step, the dust is dispersed in water, and an aqueous medium comprising an aqueous sodium chloride solution is collected; and in a fifth step, the aqueous medium is subjected to a purification which is known per se in order to collect, on the one hand, the aqueous sodium chloride solution, and, on the other hand, a solid residue comprising at least some of the heavy metals;

the process according to the invention being characterized in that the ash from the first step is subjected to washing with water and in that at least some of the water collected from the washing operation is used to disperse the dust in the fourth step.

The fumes subjected to the process according to the invention are fumes originating from the incineration of waste containing heavy metals, sodium chloride and organochlorine residues. As a result, the fumes contain hydrogen chloride and volatile heavy metals and are also laden with ash. This ash comprises sodium chloride and heavy metals. It is also possible for it to contain other water-soluble metal chlorides, as well as unburnt materials, these materials generally comprising aluminium metal.

The term heavy metals is understood to denote metals whose specific mass is at least equal to 5 $g/cm^3$, as well as beryllium, arsenic, selenium and antimony, in accordance with the generally accepted definition (Heavy Metals in Wastewater and Sludge Treatment Processes; Vol. I, CRC Press, Inc; 1987; page 2).

In the process according to the invention, the removal of dust in the first step can be carried out by any suitable means commonly used in the techniques for removing dust from gases. A cylone, an electrostatic filter or a filter with filter cloths can be used, for example.

The basic reagent used in the second step comprises a sodium compound. By definition, the sodium compound is a chemical compound containing sodium. It is generally an inorganic compound and it is basic, such that it decomposes the hydrogen chloride present in the fumes, forming sodium chloride. The sodium compound generally constitutes more than 50% (preferably at least 80%) of the weight of the basic reagent. It advantageously constitutes most, if not all, of the basic reagent.

According to an advantageous embodiment of the invention, the sodium compound comprises sodium (bi) carbonate. The expression sodium (bi)carbonate denotes either anhydrous or hydrated sodium bicarbonate, sodium carbonate or a mixture of sodium carbonate and sodium bicarbonate, for example sodium sesquicarbonate which is a compound of general formula $Na_2CO_3 \cdot NaHCO_3 \cdot 2H_2O$ obtained in particular from a trona ore. Sodium bicarbonate is preferred. In a preferred variant of this embodiment of the invention, the sodium compound consists essentially of sodium (bi)carbonate.

In addition to the sodium compound, the basic reagent can comprise additives for reinforcing the efficacy of the purification of the fumes, such as, for example, an alkali metal peroxide compound [as proposed in European patent application EP-0,779,834 from Solvay (Société Anonyme)] or a magnesium hydroxycarbonate or lignite coke as proposed in Belgian patent application 09700417 [Solvay (Société Anonyme)].

In the second step of the process according to the invention, the treatment of the fumes with the basic reagent is carried out such that the gas (laden with dust) collected after the said second step is substantially free of liquid, in particular of water. In the second step, the treatment with the basic reagent can consequently be either a dry-route treatment or a semi-wet-route treatment. The term dry-route treatment is understood to refer to a treatment in which the basic reagent is introduced in the form of a solid powder into the fumes, in the absence of a liquid, in particular of water. In general, in the dry-route treatment, the basic reagent is used in the form of a powder which is injected into a stream of fumes circulating inside a reaction chamber. The term semi-wet-route treatment is understood to refer to a treatment in which the basic reagent is introduced into the gas in the presence of an amount of liquid (usually water) such that it is totally vaporized after the second step. In the semi-wet-route treatment, the basic reagent is generally used in the form of a powder dispersed in a liquid, generally water. Information regarding the treatment of the fumes with the basic reagent is available in European patent EP-603,218 and international patent application WO 95/19835, both in the name of Solvay (Société Anonyme).

In the third step, the removal of dust from the gas can be carried out by any suitable means commonly used in the techniques for removing dust from gases. It is, however, preferred to carry out the dust-removal from the gas on a filter with filter cloths. Sleeve filters are especially recommended. A substantially purified gas is collected after the third step, and can then be discharged, without further purification, via a flue. The dust collected moreover comprises sodium chloride (resulting from the reaction of the hydrogen chloride with the sodium compound) and heavy metals, in metallic or combined form. In the case of fumes containing sulphur oxides, the dust also contains sodium sulphate (arising from the reaction of the sulphur oxides with the sodium compound). They generally also contain the excess sodium compound used to react with the hydrogen chloride and, where appropriate, the sulphur oxides.

The fourth and fifth steps of the process according to the invention are directed towards producing the aqueous sodium chloride solution. To this end, the dust is dispersed in water to dissolve the sodium chloride it contains. According to the invention, the water used to disperse the dust is water collected from the washing of the ash which was separated out in the first step. The technique used to wash the ash is not critical. For example, the ash can be subjected to stirring in water. It is recommended that the pH of the water used to wash the ash be selected such that the water collected from the washing operation has a pH value of greater than 8, preferably from 9.5 to 12.5, so as to avoid any appreciable dissolution of the heavy metals. The water used to disperse the dust in the fourth step can consist entirely of the water from washing the ash. If need be, additional water can be added thereto. As a general rule, the total amount of water used in the fourth step must be at least sufficient to dissolve all of the sodium chloride and of the other water-soluble materials in the dust. Notwithstanding this condition, the amount of water is not critical. Nevertheless, there is no advantage in using an excessive amount of water, since the aim is generally to obtain a concentrated sodium chloride solution, containing about 250 g of sodium chloride per liter. The aqueous medium obtained in the fourth step consequently consists of an aqueous sodium chloride solution containing impurities, including heavy metals. The aim of the purification carried out in the fifth step is to remove these impurities. According to an advantageous embodiment of the invention, the said purification comprises a basification of the aqueous medium to a pH value of 8 to 14, so as to precipitate the heavy metals in the form of hydroxides, a filtration and a treatment of the filtrate on a chelating resin.

The invention has the advantage that the aqueous sodium chloride solution collected after the fifth step is enriched with the sodium chloride present in the ash from the first step.

According to an advantageous embodiment of the process according to the invention, the ash collected from the washing operation is subjected to an inertization operation. In this embodiment of the process according to the invention, the inertization of the ash is facilitated due to the fact that it is substantially free of water-soluble compounds, since these were eliminated during the washing operation.

According to another embodiment of the process according to the invention, the precipitate collected in the above-mentioned fifth step is also subjected to an inertization operation. According to a variant of this embodiment of the process, the precipitate collected in the fifth step is combined with the ash, after the ash has been washed, and the mixture thus obtained is inertized.

In a particularly recommended embodiment of the two embodiment forms which have just been described, the inertization is carried out using the technique described in international patent application PCT/EP 97/00778 [Solvay (Société Anonyme)]. To this end, a reagent selected from phosphoric acid and alkali metal phosphates is added to the ash, to the precipitate from the fifth step or to a mixture thereof, the phosphatized mixture thus obtained is puddled with water and a hydraulic binder so as to form a hydraulic mortar, and the hydraulic mortar is set and hardened. The reagent used advantageously comprises sodium hexametaphosphate and the hydraulic binder is preferably Portland cement or Portland cement clinker. Moreover, in an advantageous variant of the embodiments of the invention which have just been described, the setting and hardening of the mortar are carried out under a humid atmosphere, preferably an atmosphere saturated with steam. This variant of the invention is especially recommended in the case of ash containing chromium of valency 6. The reason for this is that it has been observed that, all other factors being equal, the presence of a humid atmosphere during the setting and hardening of the hydraulic mortar has the effect of substantially improving the inertization of the chromium in the solid mass collected after hardening.

The invention applies especially to fumes produced by the incineration of household or hospital waste, this waste usually containing volatile chlorine-containing compounds, sodium chloride and other metal chlorides, and heavy metals (VGB Kraftwerkstechnik, 69, Heft 2, 1989, pages 212–220). Depending on the origin of the waste, the heavy metals comprise cadmium, mercury, antimony, lead, cobalt, chromium, copper, manganese, vanadium, tin, iron, nickel, calcium, magnesium and zinc, this list not being exhaustive. This waste moreover often contains aluminium, in metallic or alloy form.

The invention also relates to a process for, on the one hand, purifying ash-laden fumes originating from the incineration of waste which contains heavy metals, sodium chloride and organochlorine residues, and, on the other hand, for manufacturing an aqueous solution, in which process in a first step, the fumes are subjected to a dust-removal operation, from which fumes freed of dust, on the one hand, and ash, on the other hand, are collected separately;

in a second step, the fumes freed of dust are treated with a basic reagent, and a gas laden with dust is collected;

in a third step, the gas is subjected to a dust-removal operation, from which a gas freed of dust, on the one hand, and dust, on the other hand, are collected;

in a fourth step, the dust is dispersed in water, and an aqueous medium comprising an aqueous solution of a salt derived from the basic compound is collected; and in a fifth step, the aqueous medium is subjected to a purification which is known per se in order to collect, on the one hand, the aqueous solution of a salt derived from the basic compound, and, on the other hand, a solid residue comprising at least some of the heavy metals;

the said process being characterized in that the ash from the first step is subjected to washing with water and in that at least some of the water collected from the washing is used to disperse the dust in the fourth step.

Specific features and details of the invention will become apparent in the course of the description which follows of the single FIGURE in the attached drawing, which represents the plan of a plant using a specific embodiment of the process according to the invention.

The plant represented in the FIGURE comprises an oven 1 which is fed with household or hospital waste 2. This waste comprises, as outlined above, organochlorine compounds (in particular polyvinyl chloride), sodium chloride, heavy metals and aluminium.

The waste 2 is incinerated in the oven 1, from which fumes 3 emerge. These fumes comprise hydrogen chloride (originating from the decomposition of the organochlorine compounds) and volatile heavy metals, as well as, optionally, sulphur dioxide and/or nitrogen oxides. It is moreover laden with ash comprising sodium chloride, heavy metals and aluminium.

On leaving the oven 1, the fumes 3 are treated in a dust-removing unit 4 (for example a cyclone or an electrostatic filter), in order to separate the ash 5 therefrom.

The ash 5 contains sodium chloride, heavy metals and aluminium. It is transferred into a washing chamber 6, in which it is washed with a stream of water 7 in order to dissolve the sodium chloride it contains. The washing water 8, collected from the washing chamber 6, consequently comprises dissolved sodium chloride. The pH of the water 7 is adjusted such that the water 8 collected from the washing chamber 6 has a pH value substantially between 9.5 and 12.5. In this way, the dissolution of the heavy metals is minimized.

The washed ash 28, collected from the chamber 6, is substantially free of sodium chloride. It is conveyed to an inertization plant, denoted as a whole by the reference number 30. Specific features and details regarding the treatment of the ash 28 in the inertization plant 30 are available in international patent application PCT/EP 97/00778 [Solvay (Société Anonyme)].

The dust-free fumes 9 collected from the dust-removing unit 4 are conveyed into a reaction chamber 10, into which is added sodium bicarbonate 11 in powder form. The sodium bicarbonate 11 is introduced into the fumes 9 in an amount which is at least sufficient to decompose the hydrogen chloride it contains and to form sodium chloride. The fumes 12 collected from the chamber 10 are conveyed into a sleeve filter 13 in order to be freed of dust. The dust-freed fumes 14 collected from the filter 13 are vented via the flue 15.

The dust 16 collected on the filter 13 comprises sodium chloride and heavy metals. It is conveyed into a dispersion chamber 17, in which it is dispersed in the washing water 8, so as to dissolve the sodium chloride it contains. If need be, additional water 18 is added so as to dissolve all of the sodium chloride from the dust 16. The aqueous medium 19 collected in the dissolution chamber 17 comprises an aqueous solution of sodium chloride and of heavy metals. It is conveyed into a reaction chamber 20 in which it is basified by addition of sodium hydroxide 21 in an amount which is sufficient to bring its pH to between 8 and 14, which has the effect of precipitating the heavy metals in the form of hydroxides. The aqueous suspension 22 collected from the reaction chamber 20 is conveyed to a filter 23, on which the precipitate 24 of heavy metals is separated out. The filtrate 25 is conveyed to a column 26 in which it circulates in contact with a chelating resin in order to remove the final traces of heavy metals. An aqueous sodium chloride solution 27 is collected from the column 26, this solution being of sufficient purity to allow its use, without further purification, in an industrial process, for example for the manufacture of sodium carbonate by the sodium hydroxide/aqueous ammonia process, or for the production of chlorine and sodium hydroxide by electrolysis. Information regarding the treatment of the aqueous medium 19 in the reaction chamber 20 and in the column 26 is available in European patent EP-0,603,218 [Solvay (Société Anonyme)].

The precipitate 24 is optionally subjected to an inertization process, of the type described in international patent application PCT/EP 97/00778 [Solvay (Société Anonyme)]. As a variant, the precipitate 24 is combined with the ash 28 obtained from the washing chamber 6 and the mixture thus obtained is treated in the inertization plant 30.

What is claimed is:

1. In a process for purifying fumes laden with ash, originating from the incineration of waste which contains heavy metals, sodium chloride and organochlorine residues, and for manufacturing an aqueous sodium chloride solution, in which process in a first step, the fumes are subjected to a dust-removal operation, from which fumes freed of dust and ash containing sodium chloride and heavy metals are collected separately;

in a second step, the fumes freed of dust are subjected to a treatment with a basic reagent comprising more than 50% by weight of a sodium compound, said treatment being selected from a dry-route treatment and a semi-wet-route treatment, and a gas laden with dust containing sodium chloride and heavy metals is collected;

in a third step, the gas is subjected to a dust-removal operation, from which a gas freed of dust and the dust are separately collected;

in a fourth step, the dust is dispersed in water and an aqueous medium comprising an aqueous sodium chloride solution is collected; and in a fifth step, the aqueous medium is subjected to purification; the improvement which comprises:

washing said ash from said first step with a sufficient amount of water to dissolve the sodium chloride of the ash, said washing being carried out in such conditions that the water collected from the washing has a pH greater than 8; and said water of said fourth step comprising the water collected from the washing of the ash wherein the ash collected from said washing is subjected to an inertization process in which a reagent selected from phosphoric acid and alkali metal phosphates is added to the ash.

2. Process according to claim 1, wherein the sodium compound comprises sodium (bi)carbonate.

3. Process according to claim 1, wherein the pH of the water used to wash the ash is chosen such that the water collected from the washing operation has a pH of 9.5 to 12.5.

4. Process according to claim 1, wherein the heavy metals are selected from the group consisting of cadmium, mercury, antimony, lead, cobalt, chromium, copper, manganese, vanadium, tin, iron, nickel and zinc.

5. Process according to claim 1, at least some of the dust removal in the first step being carried out in a cyclone or an electrostatic filter and at least some of the dust removal in the third step being carried out in a filter with a filter cloth.

6. Process according to claim 1, wherein the purification of the aqueous medium in the fifth step comprises a basification of the said medium to a pH value of 8 to 14, a filtration, from which is collected, on the one hand, a precipitate comprising at least some of the heavy metals in the form of hydroxides, and, on the other hand, a filtrate, and a treatment of the filtrate on a chelating resin.

7. Process according to claim 1, wherein after adding said reagent to the ash collected from said washing, the phosphatized mixture thus obtained is puddled with water and a hydraulic binder so as to form a hydraulic motar, and the hydraulic mortar is set and hardened.

8. Process according to claim 7, wherein the reagent selected from phosphoric acid and alkali metal phosphates comprises sodium hexametaphosphate and the hydraulic binder comprises Portland cement or Portland cement clinker.

9. Process according to claim 7, the setting and hardening of the hydraulic mortar being carried out under an atmosphere saturated with steam.

10. Process according to claim 1, applied to fumes originating from the incineration of household and/or hospital waste.

* * * * *